US012687718B2

(12) United States Patent
Velayutham

(10) Patent No.: US 12,687,718 B2
(45) Date of Patent: Jul. 21, 2026

(54) HUD INTELLIGENT COLOR CORRECTION (HUD ICC)

(71) Applicant: Panasonic Automotive Systems Company of America, Division of Panasonic Corporation of North America, Peachtree City, GA (US)

(72) Inventor: Vijayanandh Velayutham, Peachtree City, GA (US)

(73) Assignee: Panasonic Automotive Systems America, LLC., Peachtree City, GA (US)

( * ) Notice: Subject to any disclaimer, the term of this patent is extended or adjusted under 35 U.S.C. 154(b) by 755 days.

(21) Appl. No.: 18/103,622

(22) Filed: Jan. 31, 2023

(65) Prior Publication Data

US 2023/0228992 A1     Jul. 20, 2023

Related U.S. Application Data

(60) Provisional application No. 63/299,761, filed on Jan. 14, 2022.

(51) Int. Cl.
*G02B 27/01*        (2006.01)
*B60R 1/20*         (2022.01)
*G01S 19/35*        (2010.01)

(52) U.S. Cl.
CPC ............ *G02B 27/0101* (2013.01); *B60R 1/20* (2022.01); *G01S 19/35* (2013.01); *B60R*

*2300/205* (2013.01); *G02B 2027/0118* (2013.01); *G02B 2027/0138* (2013.01); *G02B 2207/113* (2013.01)

(58) Field of Classification Search
CPC ........ G02B 27/0101; G02B 2027/0118; G02B 2027/0138; G02B 2207/113; G02B 2027/0112; G02B 2027/014; G02B 2027/0141; G02B 27/01; B60R 1/20; B60R 2300/205; G01S 19/35
See application file for complete search history.

(56) References Cited

U.S. PATENT DOCUMENTS

2017/0061593 A1*    3/2017   Alahmar ................ B60K 35/22

* cited by examiner

*Primary Examiner* — James C. Jones
(74) *Attorney, Agent, or Firm* — Laurence S. Roach, Esq.

(57) ABSTRACT

A head up display system presents information to a human driver of a motor vehicle such that the presented information is superimposed on a windshield of the motor vehicle. An image capturing device captures an image of a scene in front of the vehicle that is representative of a background against which the information is presented to the driver. An electronic processor receives signals from the image capturing device indicative of the captured images of the scene in front of the vehicle. The processor determines, based on a color of the presented information and the signals from the image capturing device, whether the presented information is readable by the driver. If it is determined that the presented information is not readable by the driver, then a color of the presented information is changed so as to make the presented information more readable by the driver.

15 Claims, 5 Drawing Sheets

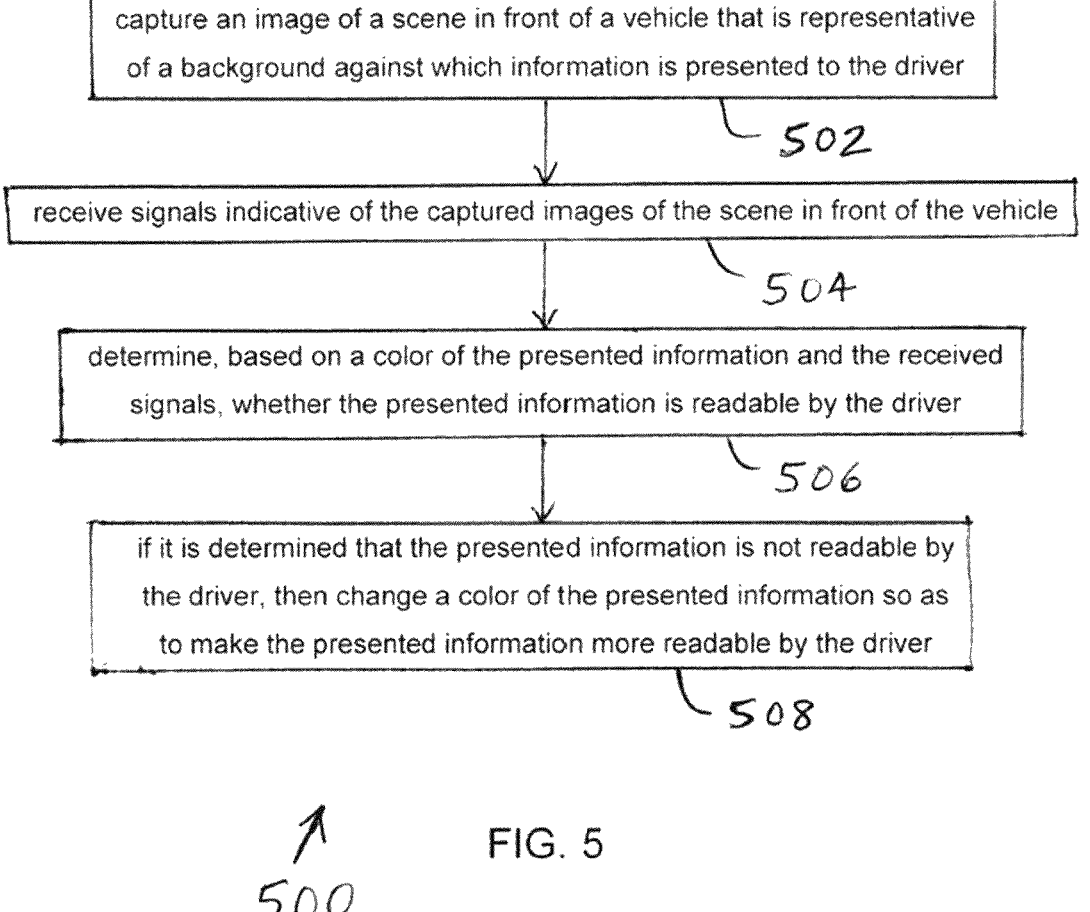

capture an image of a scene in front of a vehicle that is representative of a background against which information is presented to the driver — 502 receive signals indicative of the captured images of the scene in front of the vehicle — 504 determine, based on a color of the presented information and the received signals, whether the presented information is readable by the driver — 506 if it is determined that the presented information is not readable by the driver, then change a color of the presented information so as to make the presented information more readable by the driver — 508

HUD INTELLIGENT COLOR CORRECTION (HUD ICC)

CROSS-REFERENCED TO RELATED APPLICATIONS

This application claims benefit of U.S. Provisional Application No. 63/299,761, filed on Jan. 14, 2022, the disclosure of which is hereby incorporated by reference in its entirety for all purposes.

BACKGROUND OF THE INVENTION

1. Field of the Invention.

The present invention relates to a head up display (HUD) of a motor vehicle.

2. Description of the Related Art.

A head up display emits light that reflects from the front windshield to be seen by the driver. The light appears to come from a virtual image in front of the driver and in front of the windshield. This type of head up display is currently commercially available.

Conventional head up displays create the virtual image by first using a display or picture generation unit to create an image. Next, the light from the image is reflected from one or more mirrors. Next, the light from the mirrors is directed up to the windshield and is then reflected from the windshield towards the driver. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

A problem with a HUD is that sometimes the colors being displayed are close to the colors in the ambient environment in the background of the display, which can make the display difficult to see.

SUMMARY OF THE INVENTION

The invention may provide an intelligent system on a HUD to detect poor visibility of display information for the driver on the head-up display and correct the display of information by applying an intelligent color correction (ICC) method. The system may use the front camera on the vehicle to get the front video stream (e.g., showing an object/road/any external environment on the front, adverse weather conditions such as rain/snow/glare or external light facing the vehicle) and analyze the color pattern on the received frames. The system then compares the analyzed frames with the display information. If the comparison indicates that the driver cannot see the display information (i.e., the comparison "fails") due to the background image on the frame, then the system applies the ICC method automatically to change/correct the color of the display information to improve visibility such that the driver can easily recognize/read the information on the HUD without losing any critical or safety critical data.

The system may automatically monitor whether it is daytime or nighttime using a light sensor located on the vehicle to apply the ICC during day and night. During day or night, the system may recognize the glare and apply the ICC using the front image frames.

The system may use the vehicle's GPS to get the vehicle routes and learn the present and future locations of the vehicle and automatically apply ICC. The system may ensure that the detection logic is true in specific cases and may not apply the ICC if the detection logic fails. The system may remember the previous routes and the ICC logic applied to that location/route as well.

The system may be a standalone HUD, AR-HUD (Augmented reality HUD), in-vehicle infotainment (IVI) system, instrument cluster, E-cockpit engine control unit (ECU), or any ECU that controls and provides the HUD/AR-HUD content.

The invention may solve problems regarding a driver's inability to read the information displayed on the HUD and critical information missed by the driver. The system may also reduce the risk of hazards by detecting critical information not being visibly presented to the driver.

The invention comprises, in one form thereof, a head up display system that presents information to a human driver of a motor vehicle such that the presented information is superimposed on a windshield of the motor vehicle. An image capturing device captures an image of a scene in front of the vehicle that is representative of a background against which the information is presented to the driver. An electronic processor is communicatively coupled to the image capturing device. The electronic processor receives signals from the image capturing device indicative of the captured images of the scene in front of the vehicle. The processor determines, based on a color of the presented information and the signals from the image capturing device, whether the presented information is readable by the driver. If it is determined that the presented information is not readable by the driver, then a color of the presented information is changed so as to make the presented information more readable by the driver. Information can be in the form of textual or graphical format.

The invention comprises, in another form thereof, a head up display system for presenting information to a human driver of a motor vehicle such that the presented information is superimposed on a windshield of the motor vehicle. A light sensor detects a level of ambient light associated with the vehicle. An electronic processor is communicatively coupled to the light sensor. The electronic processor receives signals from the light sensor, and determines, based on a color and/or brightness of the presented information and the signals from the light sensor, whether the presented information is readable by the driver. If it is determined that the presented information is not readable by the driver, then a color of the presented information is changed so as to make the presented information more readable by the driver.

The invention comprises, in yet another form thereof, a head up display system for presenting information to a human driver of a motor vehicle such that the presented information is superimposed on a windshield of the motor vehicle. A global positioning device determines global location coordinates of the motor vehicle. An image capturing device captures an image of a scene in front of the vehicle that is representative of a background against which the information is presented to the driver. A memory device is communicatively coupled to the global positioning device and to the image capturing device. The memory device stores the captured images in association with the global location coordinates of the motor vehicle at times at which the images were captured. A navigation system determines a planned route of the motor vehicle. An electronic processor is communicatively coupled to the global positioning device, the memory device and the navigation system. The electronic processor receives signals from the memory device indicative of ones of the stored captured images that are associated with the planned route of the motor vehicle. The electronic processor determines, dependent upon the signals from the memory device, a selected color of the presented information so as to make the presented information readable by the driver during travel along the planned route. The electronic processor presents the information in the selected color while the motor vehicle is traveling along the planned route.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 5 is a flow chart of another embodiment of a color correction method of the present invention.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
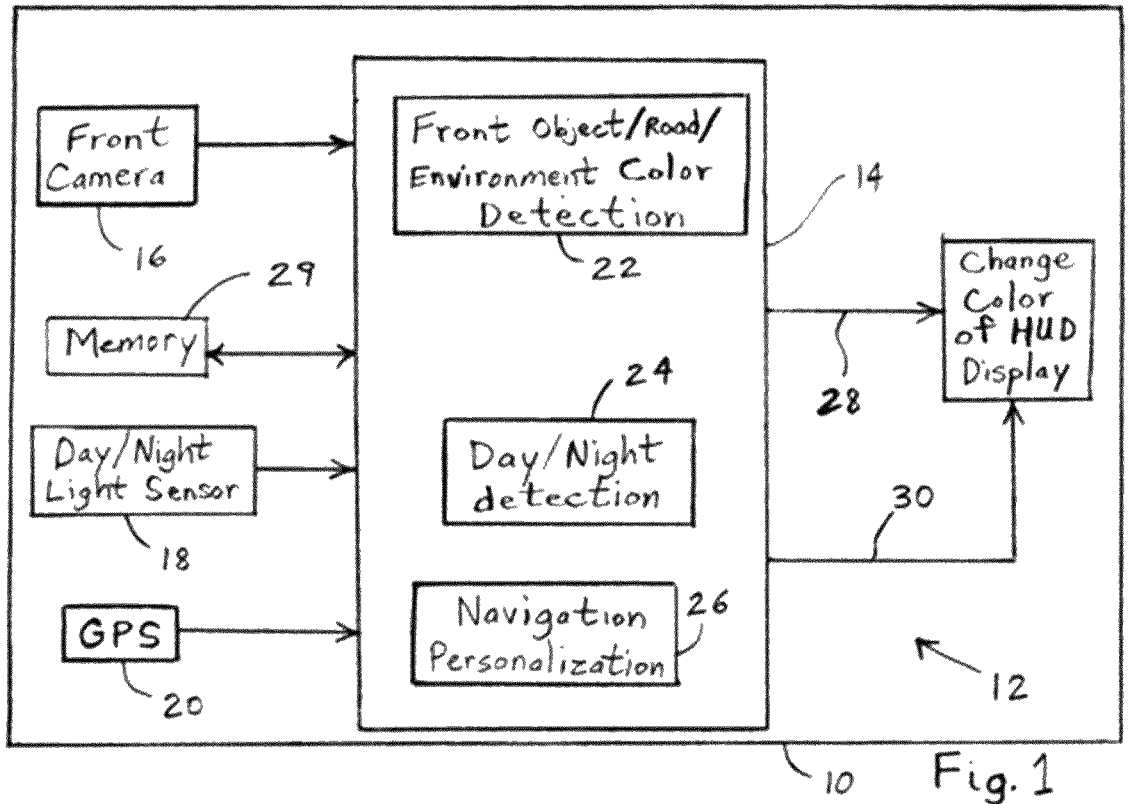
FIG. 1 is a block diagram of one embodiment of a HUD intelligent color correction (ICC) arrangement of the present invention.

FIG. 1 illustrates one embodiment of a motor vehicle 10 including a HUD intelligent color correction (ICC) arrangement 12 of the present invention. Arrangement 12 includes an electronic head up display control processor 14, a forward-facing camera 16, a day/night light sensor 18 and a global positioning (GPS) system module 20. Processor 14 includes a front object/road/environment color detection module 22, a day/night detection module 24 and a navigation personalization module 26.

Processor 14 may realize the HUD. The HUD can be a standalone HUD, an instrument cluster, and e-cockpit ECU, or other ECU which controls the HUD.

In response to processor 14 determining that the text presented by the HUD is not readable by the driver due to the detected colors of the background object(s), then, as indicated at 28, the color of the information presented on the HUD is changed so that the information is readable to a human.

In response to processor 14 detecting that the vehicle's planned route matches a previous route of the vehicle, background colors on the previous route may be retrieved from a memory device 29. In response to processor 14 determining that the text to be presented by the HUD would not be readable by the driver due to the detected colors of the background object(s) in the future planned route (which matches the previous route), then, as indicated at 30, the color of the information to be presented on the HUD is changed so that the information is readable to a human. That is, processor 14 may perform color correction.

Figure 2:
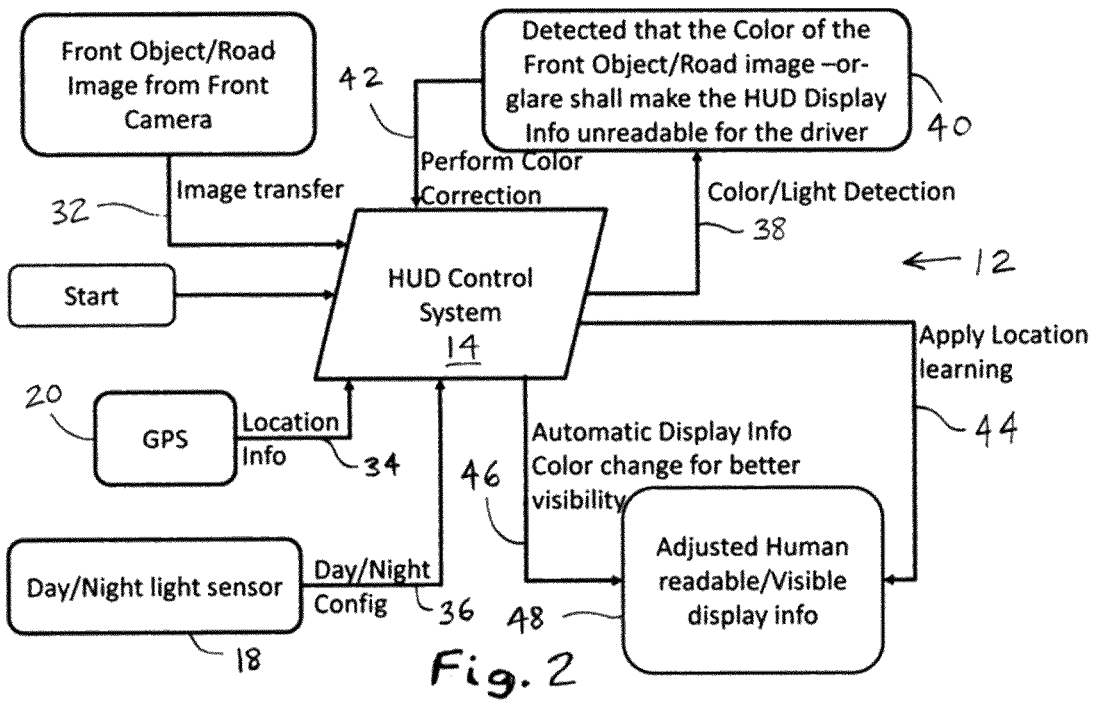
FIG. 2 is another block diagram of the HUD intelligent color correction (ICC) arrangement of FIG. 1.

FIG. 2 further illustrates the HUD intelligent color correction (ICC) arrangement 12 of FIG. 1. As indicated at 32, an image of the scene in front of vehicle 10, which may include objects, landscaping and roads, is captured by camera 16 and transmitted to processor 14. As indicated at 34, vehicle location information is transmitted to processor 14 by GPS module 20. As indicated at 36, an indication of whether it is currently daytime or nighttime is transmitted to processor 14 by day/night light sensor 18. Processor 14 may use all the information received at 32, 34 and 36 to determine, as indicated at 38, the background color and light conditions for the HUD presentation. Further, processor 14 may determine at 40 that the color of the front object/road image (e.g., the background image), and/or the amount of glare, shall make the information presented by the HUD unreadable by the driver. In response to the determination that the HUD presentation will be unreadable, color correction of the HUD presentation may be performed, as indicated at 42, to provide greater color contrast between the background color and the color of the information presented on the HUD.

As indicated at 44, location learning may be applied to determine a future background based on a planned route matching a previous route, wherein it is assumed that the background on the planned route will substantially match the background that was recorded on the previous route. Based on this applied location learning, the color of the display information may be automatically changed for better visibility by the human driver, as indicated at 46. The result is that the displayed information is adjusted so as to be readable and/or visible by the human driver, as indicated at 48.

Figure 3:
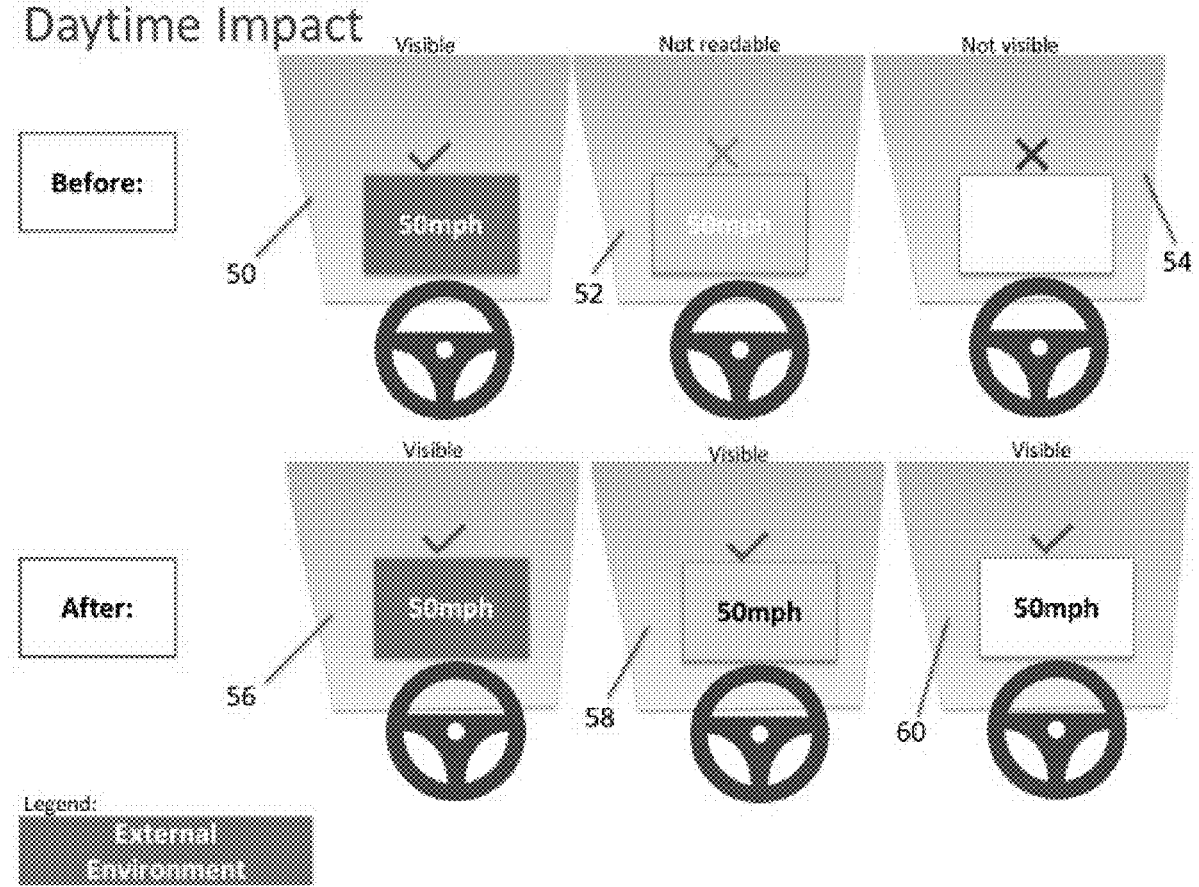
FIG. 3 is a schematic diagram of one embodiment of a color correction method of the present invention as applied during the daytime.

FIG. 3 is a schematic diagram of one embodiment of a color correction method of the present invention as applied during the daytime. The HUD presentations indicated at 50, 52 and 54 each include the text "50 mph" in white font. At 50, the background is dark enough for the text presentation to be readable and visible. At 52, the background is light enough for the text presentation to be visible but not readable. At 54, the background is light enough for the text presentation to be neither visible nor readable. At 56, no color correction is taken, and the text presentation at 50 remains readable and visible. At 58, color correction is performed to darken the text presentation at 52, and the resulting text presentation remains visible and also becomes readable. At 60, color correction is performed to darken the text presentation at 54, and the resulting text presentation becomes both visible and readable.

Figure 4:
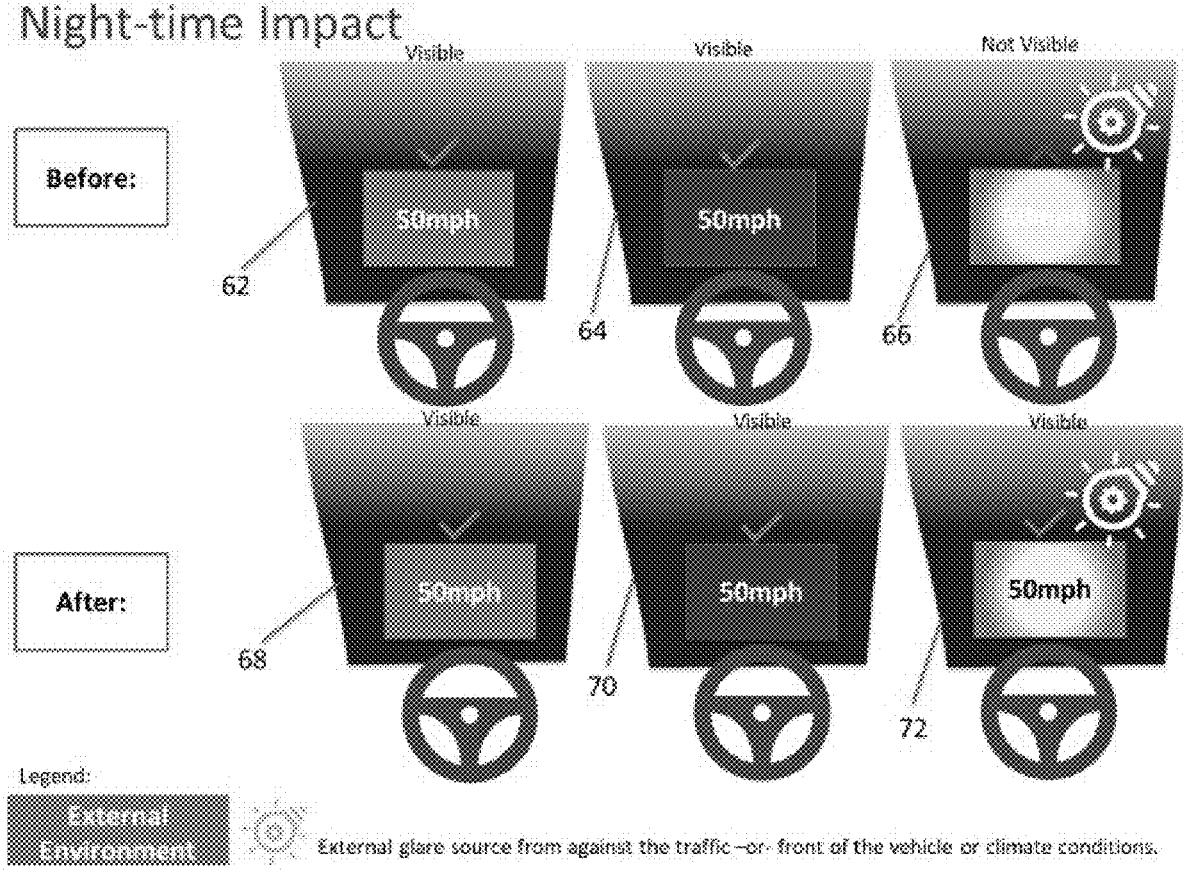
FIG. 4 is a schematic diagram of one embodiment of a color correction method of the present invention as applied during the nighttime.

FIG. 4 is a schematic diagram of one embodiment of a color correction method of the present invention as applied during the nighttime. The HUD presentations indicated at 62, 64 and 66 each include the text "50 mph" in white font. At 62 and 64, the background is dark enough for the text presentation to be readable and visible. At 66, the background is light enough for the text presentation to be neither visible nor readable. The lightness of the background may be due to a glare source such as headlights of oncoming traffic, the headlights of vehicle 10, climate conditions (e.g., moonlight). At 68 and 70, no color correction is taken, and the text presentations at 62 and 64 remain readable and visible. At 72, color correction is performed to darken the text presentation at 66, and the resulting text presentation becomes both visible and readable, despite the glare.

FIG. 5 illustrates another embodiment of a color correction method 500 of the present invention. In a first step 502, an image is captured of a scene in front of a vehicle that is representative of a background against which the information is presented to the driver. For example, an image of the scene in front of vehicle 10, which may include objects, landscaping and roads, is captured by camera 16.

In a next step 504, signals are received that are indicative of the captured image of the scene in front of the vehicle. For example, camera 16 may convert the captured images into electronic signals. As indicated at 32 in FIG. 2, the signals may be transmitted to, and received by, processor 14.

Next, in step 506, it is determined, based on a color of the presented information and the received signals, whether the presented information is readable by the driver. For example, processor 14 may determine at 40 (FIG. 2) whether the color of the front object/road image (e.g., the background image), and/or the amount of glare, shall make the information presented by the HUD unreadable by the driver. That is, the color of the background image may be so close to the color of the text or graphical information presented by the HUD, that the information presented by the HUD blends into the background and cannot be discerned by the driver.

In a final step 508, if it is determined that the presented information is not readable by the driver, then a color of the presented information is changed so as to make the presented information more readable by the driver. For example, if processor 14 determines that the color of the presented information is too close to the color of the background for the presented information to be seen, then color correction of the HUD presentation may be performed, as indicated at 42 (FIG. 2) to provide greater color contrast between the background color and the color of the information presented on the HUD.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A head up display system for presenting information to a human driver of a motor vehicle such that the presented information is superimposed on a windshield of the motor vehicle, the system comprising:

an image capturing device configured to capture an image of a scene in front of the vehicle that is representative of a background against which the information is presented to the driver; and an electronic processor communicatively coupled to the image capturing device, the electronic processor being configured to:

receive signals from the image capturing device indicative of the captured images of the scene in front of the vehicle;

determine, based on a color of the presented information and the signals from the image capturing device, whether the presented information is readable by the driver;

if it is determined that the presented information is not readable by the driver, then change a color of the presented information so as to make the presented information more readable by the driver;

a global positioning device configured to determine global location coordinates of the motor vehicle, wherein the electronic processor is configured to determine, dependent upon the global location coordinates of the motor vehicle, whether the presented information is readable by the driver;

a memory device communicatively coupled to the global positioning device and to the image capturing device, the memory device being configured to store the captured images in association with the global location coordinates of the motor vehicle at times at which the images were captured, the electronic processor being configured to:

receive signals from the memory device indicative of ones of the stored captured images that are associated with a planned route of the motor vehicle;

determine, dependent upon the signals from the memory device, whether information to be presented to the driver will be readable by the driver and if it is determined that the information to be presented to the driver will not be readable by the driver, then change a planned color of the information to be presented to the driver so as to make the presented information more readable by the driver.

2. The system of claim 1 wherein the electronic processor is configured to determine, based on a level of contrast between the color of the presented information and a color of the background against which the information is presented to the driver, whether the presented information is readable by the driver.

3. The system of claim 2 wherein the electronic processor is configured to change a color of the presented information to increase the level of contrast between the color of the presented information and the color of the background against which the information is presented to the driver in response to determining that the presented information is not readable by the driver.

4. The system of claim 1 wherein the image capturing device comprises a camera.

5. The system of claim 1 further comprising a light sensor communicatively coupled to the electronic processor and configured to detect a level of ambient light surrounding the vehicle, wherein the electronic processor is configured to receive signals from the light sensor, and determine, dependent upon the signals from the light sensor, whether the presented information is readable by the driver.

6. A head up display system for presenting information to a human driver of a motor vehicle such that the presented information is superimposed on a windshield of the motor vehicle, the system comprising:

a light sensor configured to detect a level of ambient light associated with the vehicle;

an image capturing device configured to capture an image of a scene in front of the vehicle that is representative of a background against which the information is presented to the driver;

a global positioning device configured to determine global location coordinates of the motor vehicle;

a memory device communicatively coupled to the global positioning device and to the image capturing device, the memory device being configured to store the captured images in association with the global location coordinates of the motor vehicle at times at which the images were captured; and an electronic processor communicatively coupled to the light sensor, the electronic processor being configured to:

receive signals from the light sensor;

determine, based on a color and/or brightness of the presented information and the signals from the light sensor, whether the presented information is readable by the driver;

7

8 if it is determined that the presented information is not readable by the driver, then change a color of the presented information so as to make the presented information more readable by the driver;

receive signals from the image capturing device indicative of the captured images of the scene in front of the vehicle;

determine, dependent upon a color of the presented information and the signals from the image capturing device, whether the presented information is readable by the driver;

determine, dependent upon the global location coordinates of the motor vehicle, whether the presented information is readable by the driver;

receive signals from the memory device indicative of ones of the stored captured images that are associated with a planned route of the motor vehicle;

determine, dependent upon the signals from the memory device, whether information to be presented to the driver will be readable by the driver; and if it is determined that the information to be presented to the driver will not be readable by the driver, then change a planned color of the information to be presented to the driver so as to make the presented information more readable by the driver.

7. The system of claim 6 wherein the electronic processor is configured to determine, dependent upon a level of contrast between the color of the presented information and a color of the background against which the information is presented to the driver, whether the presented information is readable by the driver.

8. The system of claim 7 wherein the electronic processor is configured to change a color of the presented information to increase the level of contrast between the color of the presented information and the color of the background against which the information is presented to the driver in response to determining that the presented information is not readable by the driver.

9. The system of claim 6 wherein the image capturing device comprises a camera.

10. A head up display system for presenting information to a human driver of a motor vehicle such that the presented information is superimposed on a windshield of the motor vehicle, the system comprising:

a global positioning device configured to determine global location coordinates of the motor vehicle;

an image capturing device configured to capture an image of a scene in front of the vehicle that is representative of a background against which the information is presented to the driver;

a memory device communicatively coupled to the global positioning device and to the image capturing device, the memory device being configured to store the captured images in association with the global location coordinates of the motor vehicle at times at which the images were captured;

a navigation system configured to determine a planned route of the motor vehicle; and an electronic processor communicatively coupled to the global positioning device, the memory device and the navigation system, the electronic processor being configured to:

receive signals from the memory device indicative of ones of the stored captured images that are associated with the planned route of the motor vehicle;

determine, dependent upon the signals from the memory device, a selected color of the presented information so as to make the presented information readable by the driver during travel along the planned route; and present the information in the selected color while the motor vehicle is traveling along the planned route.

11. The system of claim 10 wherein the electronic processor is configured to determine, dependent upon a level of contrast between the color of the presented information and a color of the background against which the information is presented to the driver, whether the presented information is readable by the driver.

12. The system of claim 11 wherein the electronic processor is configured to change a color of the presented information to increase the level of contrast between the color of the presented information and the color of the background against which the information is presented to the driver in response to determining that the presented information is not readable by the driver.

13. The system of claim 10 wherein the image capturing device comprises a camera.

14. The system of claim 10 further comprising a light sensor communicatively coupled to the electronic processor and configured to detect a level of ambient light surrounding the vehicle, wherein the electronic processor is configured to receive signals from the light sensor, and determine, dependent upon the signals from the light sensor, whether the presented information is readable by the driver.

15. The system of claim 10 wherein the electronic processor is configured to determine, dependent upon the global location coordinates of the motor vehicle, whether the presented information is readable by the driver.

* * * * *